United States Patent
Baruco et al.

(10) Patent No.: US 8,334,758 B2
(45) Date of Patent: Dec. 18, 2012

(54) LIN BUS REMOTE CONTROL SYSTEM

(75) Inventors: Sam Baruco, Aurora (CA); Victor Rabinovich, Richmond Hill (CA); Yaroslaw Matkiwsky, Whitby (CA); Tom Bednarchuk, Zephyr (CA)

(73) Assignee: Flextronics Automotive, Inc., Scarborough, Ontario (CA)

( * ) Notice: Subject to any disclaimer, the term of this patent is extended or adjusted under 35 U.S.C. 154(b) by 662 days.

(21) Appl. No.: 12/422,376

(22) Filed: Apr. 13, 2009

(65) Prior Publication Data

US 2011/0241847 A1 Oct. 6, 2011

(51) Int. Cl.
G08C 19/16 (2006.01)

(52) U.S. Cl. .................. 340/12.5; 340/12.1; 341/176

(58) Field of Classification Search ............ 340/12.5, 340/12.1; 341/176
See application file for complete search history.

(56) References Cited

U.S. PATENT DOCUMENTS

| | | | |
|---|---|---|---|
| 4,381,566 A * | 4/1983 | Kane | 455/193.3 |
| 5,420,599 A * | 5/1995 | Erkocevic | 343/828 |
| 5,706,399 A * | 1/1998 | Bareis | 704/274 |
| 5,726,566 A * | 3/1998 | Quist et al. | 324/95 |
| 6,028,537 A | 2/2000 | Suman et al. | |
| 6,420,797 B1 * | 7/2002 | Steele et al. | 307/9.1 |
| 6,496,107 B1 * | 12/2002 | Himmelstein | 340/426.1 |
| 6,643,389 B1 * | 11/2003 | Raynal et al. | 382/124 |
| 6,812,891 B2 * | 11/2004 | Montgomery et al. | 343/700 MS |
| 6,906,669 B2 * | 6/2005 | Sabet et al. | 343/700 MS |
| 6,952,155 B2 * | 10/2005 | Himmelstein | 340/5.52 |
| 7,432,816 B1 * | 10/2008 | Ku et al. | 340/572.7 |
| 7,518,553 B2 * | 4/2009 | Zhang et al. | 343/700 MS |
| 7,701,943 B2 * | 4/2010 | Harris et al. | 370/392 |
| 7,830,327 B2 * | 11/2010 | He | 343/828 |
| 2001/0000430 A1 | 4/2001 | Smith | |
| 2002/0175879 A1 * | 11/2002 | Sabet et al. | 343/895 |
| 2003/0002033 A1 * | 1/2003 | Boman | 356/139.03 |
| 2003/0222778 A1 * | 12/2003 | Piesinger | 340/541 |
| 2004/0056812 A1 * | 3/2004 | Sabet et al. | 343/725 |
| 2004/0122602 A1 * | 6/2004 | Nagase | 702/51 |
| 2005/0001777 A1 * | 1/2005 | Suganthan et al. | 343/795 |
| 2005/0012593 A1 * | 1/2005 | Harrod et al. | 340/5.72 |
| 2005/0195125 A1 * | 9/2005 | Brandwein, Jr. | 343/895 |
| 2005/0212544 A1 * | 9/2005 | Nakajima | 324/763 |
| 2005/0275505 A1 * | 12/2005 | Himmelstein | 340/5.8 |
| 2005/0280508 A1 * | 12/2005 | Mravca et al. | 340/10.2 |
| 2006/0164237 A1 * | 7/2006 | Medve et al. | 340/539.13 |

(Continued)

FOREIGN PATENT DOCUMENTS

WO WO 2008036017 A1 * 3/2008

*Primary Examiner* — Daniel Wu
*Assistant Examiner* — Kam Ma
(74) *Attorney, Agent, or Firm* — Volpe and Koenig, P.C.

(57) ABSTRACT

A local interconnect network BUS remote control system, including a printed circuit board antenna for receiving wireless communications signals and transmitting them to at least one radio frequency module, the printed circuit board antenna including a digital layer; a power layer; a ground layer; a radio frequency layer; at least one radio frequency module mounted on the vehicle, the at least one frequency module in communication with the printed circuit board antenna for demodulating the wireless communication signals into local interconnect network signals; a local interconnect network BUS in communication with the at least one frequency module for receiving the local interconnect network signals; and a local interconnect network controller in communication with the local interconnect network BUS for receiving the local interconnect network signals.

19 Claims, 15 Drawing Sheets

U.S. PATENT DOCUMENTS

| | | | |
|---|---|---|---|
| 2006/0181888 A1* | 8/2006 | Alvarez Garcia et al. | 362/459 |
| 2006/0192660 A1* | 8/2006 | Watanabe et al. | 340/435 |
| 2006/0219473 A1* | 10/2006 | Boland et al. | 181/139 |
| 2007/0040649 A1* | 2/2007 | Dulgerian et al. | 340/5.64 |
| 2007/0126561 A1 | 6/2007 | Breed | |
| 2007/0152903 A1 | 7/2007 | Lin et al. | |
| 2007/0164859 A1* | 7/2007 | Cobianu et al. | 340/539.26 |
| 2008/0252432 A1 | 10/2008 | Hein et al. | |
| 2008/0258914 A1* | 10/2008 | Kondo et al. | 340/552 |
| 2008/0266083 A1* | 10/2008 | Midholt et al. | 340/540 |
| 2008/0272958 A1* | 11/2008 | Schiffmann et al. | 342/118 |
| 2008/0284661 A1* | 11/2008 | He | 343/700 MS |
| 2009/0085815 A1* | 4/2009 | Jakab et al. | 343/702 |
| 2009/0224958 A1* | 9/2009 | Aphek et al. | 342/54 |
| 2009/0309714 A1* | 12/2009 | Baruco et al. | 340/539.11 |
| 2010/0017072 A1* | 1/2010 | Emilsson | 701/49 |
| 2011/0241847 A1* | 10/2011 | Baruco et al. | 340/12.5 |

* cited by examiner

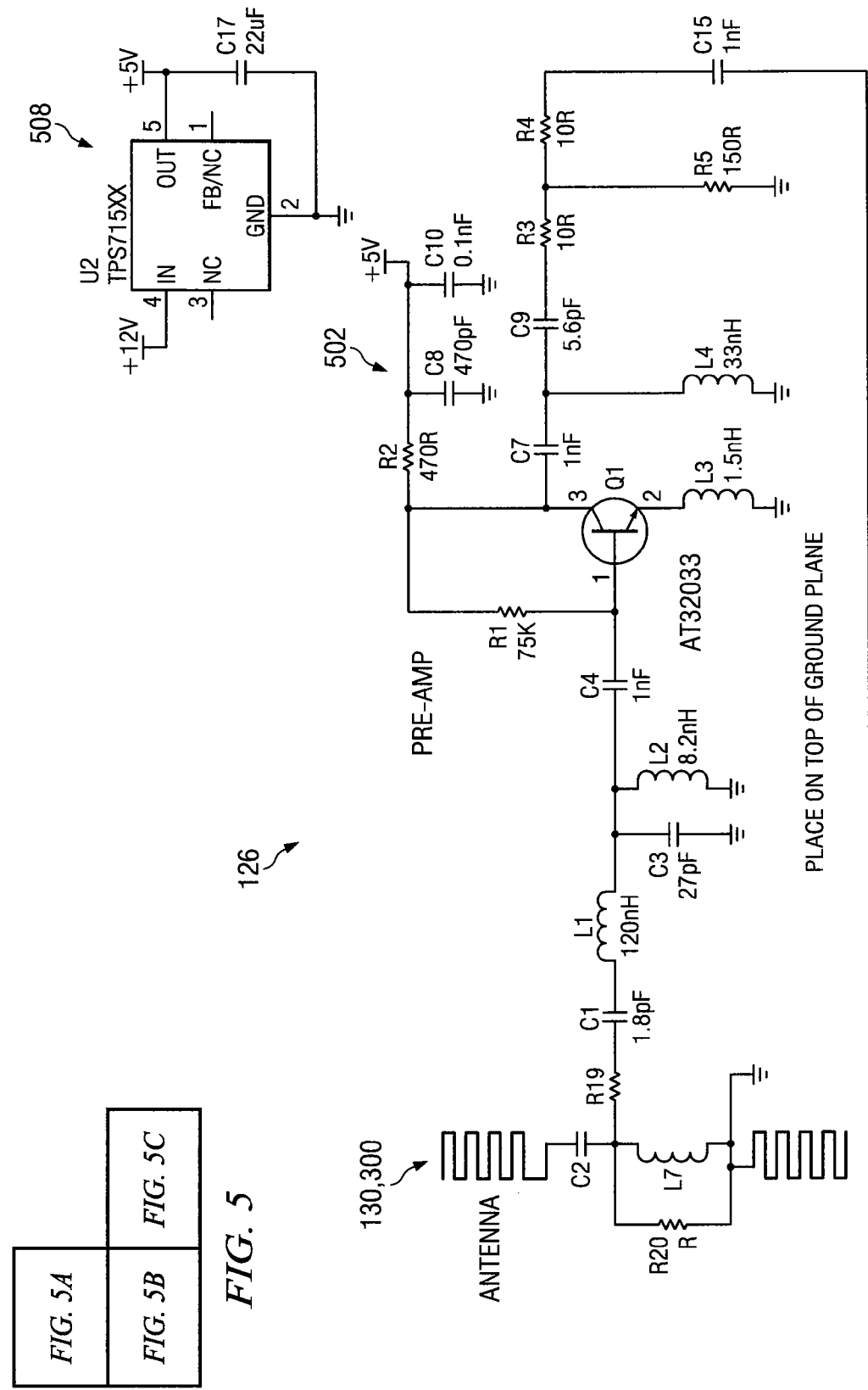

| FIG. 6A |
| FIG. 6B |
| FIG. 6C |

LIN BUS REMOTE CONTROL SYSTEM

BACKGROUND

Designers of vehicles have embraced technology in recent years. Some of the technologies that have been incorporated into vehicles include electromechanical systems, such as automatic liftgates and sliding doors, remote control transponder/keyfobs, airbags, wireless remote starters, voice activated telephones and sound systems, and so forth. Many of these technologies improve safety, while others improve convenience for users. In many cases, consumers of vehicles are much or more concerned about technology included in each vehicle than performance of the actual vehicle.

Different systems exist to manage these different technologies. For example, some existing system architectures use antennas that are located away from the wireless control module ("WCM"), or other control modules, and are connected through a radio frequency ("RF") cable. These data transmission cables and their connectors are expensive, and the increased length of the cables adds noise to the signal, interfering with the data transmitted between the receiver and the WCM. In situations where more than one antenna is needed, there are additional RF cables required, and the WCM must use a RF switch to multiplex the different antennas.

SUMMARY

The above-described problems are solved and a technical advance achieved by the local interconnect network ("LIN") BUS remote control system disclosed in this application. The novel LIN BUS remote control system uses a network of RF modules, including LIN transceivers, that replaces the WCM that are in communication with a LIN control module via a LIN BUS. Similarly, the LIN BUS remote control system may include PCB antennas, amplifiers, and receivers in a small module that may be mounted according the antenna's mounting requirements, and through use of LIN communications to reduce the need for the specialized connectors or transmission cables. Since the receiver is located in close proximity to the PCB antenna there is very little noise generated between PCB antennas and receivers. The present LIN BUS remote control system may also provide for a LIN antenna to boost a wider range than its conventional equivalent.

The present LIN BUS remote control system may integrate various applications, such as passive entry/activation, voice activation, and hands-free technology (capacitive sensors) into a single control module. The present LIN BUS remote control system provides for diverse functionality, placement, and operation unique in automotive applications, for example.

To further improve conveniences of vehicles, the principles of the present LIN BUS remote control system may incorporate wireless communications and voice communications external to a vehicle to activate electromechanical systems of the vehicle. By using both wireless communications, such as passive, active, and/or semi-passive transponder/keyfobs and voice recognition systems, safety and security is provided by preventing unauthorized or undesired activation of the electromechanical systems.

The present LIN BUS remote control system may use any number of LIN control modules and RF modules throughout a vehicle. The LIN BUS remote control system reduces the wiring harness complexity of existing systems by utilizing the LIN bus network already in place on a vehicle and eliminating the need for special cables and connectors between the PCB antenna and a WCM. Each control module may contain multiple functions and be networked together with other control modules to share functions and responsibilities. In addition, the control modules of the present LIN BUS remote control system may perform different functions located throughout a vehicle.

In one embodiment, the local interconnect network BUS remote control LIN BUS remote control system includes a printed circuit board antenna for receiving wireless communications signals and transmitting them to at least one radio frequency module, the printed circuit board antenna including a digital layer; a power layer; a ground layer; a radio frequency layer; at least one radio frequency module mounted on the vehicle, the at least one frequency module in communication with the printed circuit board antenna for demodulating the wireless communication signals into local interconnect network signals; a local interconnect network BUS in communication with the at least one frequency module for receiving the local interconnect network signals; and a local interconnect network controller in communication with the local interconnect network BUS for receiving the local interconnect network signals.

In one aspect, the radio frequency layer includes a positive meander line antenna and a negative meander line antenna. Additionally, the radio frequency layer may include a connection to a radio frequency receiver. Also, the radio frequency layer may include a connection to a low noise amplifier. Further, the radio frequency layer may include a via for connecting with a via in the ground layer. In another aspect, the radio frequency layer may include a first tuning element for tuning the positive meander line antenna and the negative meander line antenna. In yet another aspect, the radio frequency layer may include a second tuning element for tuning the positive meander line antenna and the negative meander line antenna.

The local interconnect network BUS remote control system may further include a transponder/keyfob configured to generate the wireless communications signal in response to activation by a user. Preferably, the at least one radio frequency module operates with low frequency ("LF") radio frequency signals between approximately 30 kHz and 300 kHz. Also preferably, the at least one radio frequency module operates with ultrahigh ("UHF") radio frequency signals between approximately 300 MHz and 3,000 MHz. The local interconnect network BUS may include a communications line and at least two power lines. Preferably, the local interconnect network controller controls one of electromechanical devices, control sliding doors, power tailgates, power windows, remote vehicle starters, power locks, car alarms, and panic functions.

In another embodiment, the present local interconnect network BUS remote control system, includes a printed circuit board antenna for receiving wireless communications signals and transmitting them to at least one radio frequency module, the printed circuit board antenna including a digital layer; a power layer; a ground layer; a radio frequency layer including a positive meander line antenna and a negative meander line antenna; at least one radio frequency module mounted on the vehicle, the at least one frequency module in communication with the printed circuit board antenna for demodulating the wireless communication signals into local interconnect network signals; a local interconnect network BUS in communication with the at least one frequency module for receiving the local interconnect network signals; a local interconnect network controller in communication with the local interconnect network BUS for receiving the local interconnect network signals; and at least one driver in communication with the local interconnect network controller for controlling at least one of electromechanical devices, control sliding doors, power tailgates, power windows, remote vehicle starters, power locks, car alarms, and panic functions.

In one aspect, the radio frequency layer includes a connection to a radio frequency receiver. Further, the radio frequency layer may include a connection to a low noise amplifier. Also, the radio frequency layer may include a via for connecting with a via in the ground layer. The radio frequency layer may include a first tuning element for tuning the positive meander line antenna and the negative meander line antenna and a second tuning element for tuning the positive meander line antenna and the negative meander line antenna. Additionally, the local interconnect network BUS remote control system may further include a transponder/keyfob configured to generate the wireless communications signal in response to activation by a user. The at least one radio frequency module operates with ultrahigh radio frequency signals between approximately 300 MHz and 3,000 MHz.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION

Figure 1:
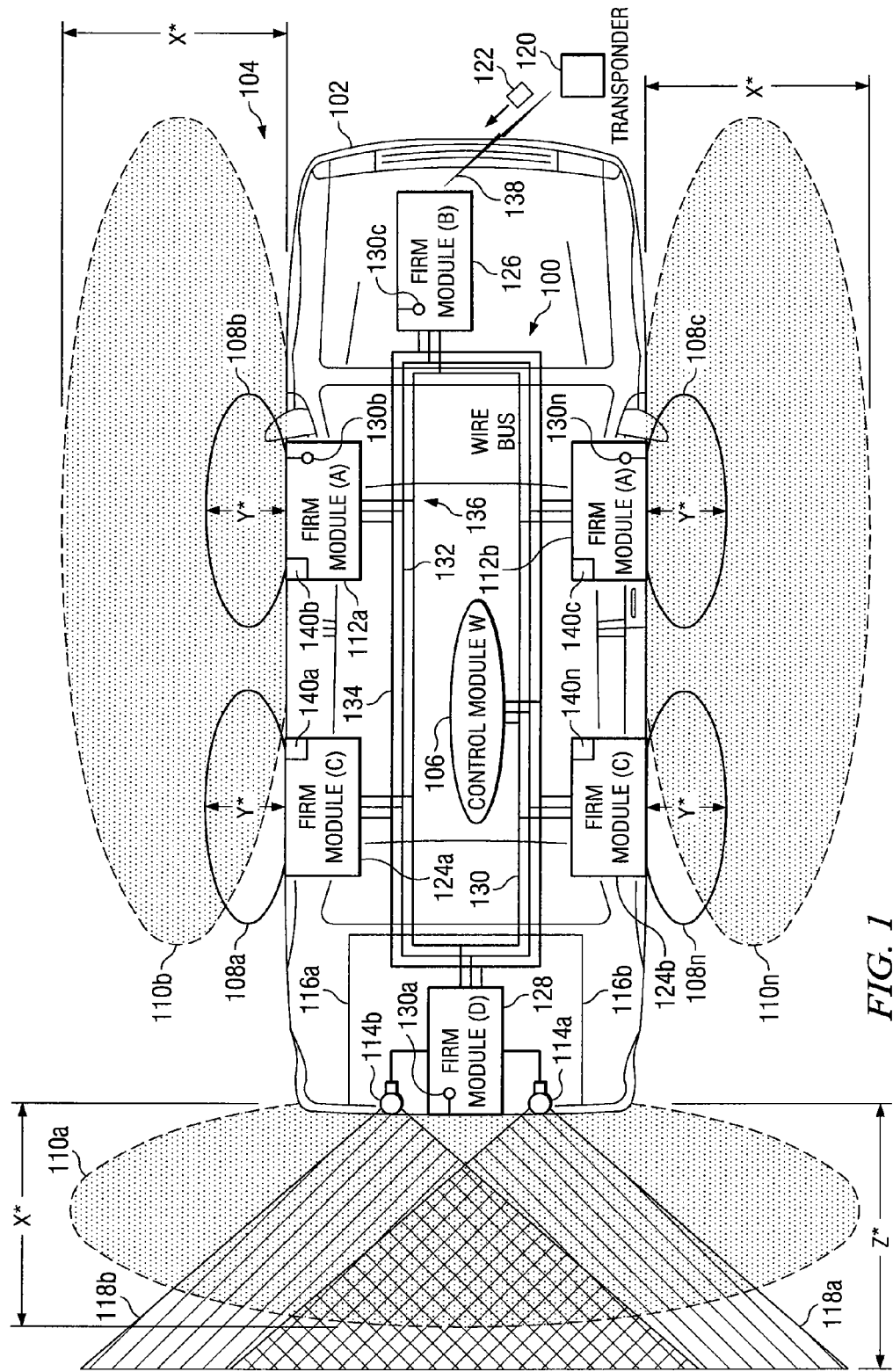
FIG. 1 is an illustration of an exemplary vehicle that enables a user to monitor and/or control electromechanical systems and subsystems using the LIN BUS remote control system according to an embodiment of the present invention.

FIG. 1 is an illustration of an exemplary vehicle 104 using an embodiment of LIN BUS remote control system 100. Vehicle 104 includes a vehicle body 102 that generally defines vehicle 104. For the purposes of this description, vehicle body 102 may include any structure or component of vehicle 104, including roof, sidewalls, doors, windows, bumpers, seats, mirrors, and any other physical feature of vehicle 104.

LIN BUS remote control system 100 may include any number of RF modules, such as RF modules 112a-112b (collectively 112), 124a-124b (collectively 124), 126, and 128. LIN BUS remote control system 100 may include a LIN control module 106 for controlling RF modules 112, 124, 126, 128. Any number of RF modules 112, 124, 126, 128 and control module 106 may be located anywhere in or on vehicle 104. RF modules 112, 124, 126, 128 may be connected together by a LIN bus 136, which may include two power lines 130 and 132 and a communications line 134. Any number of lines may be used for LIN bus 136. FIG. 1 shows vehicle 104 with four different types of RF modules 112, 124, 126, and 128, each located in different locations within vehicle 104, with different functions and implemented technologies.

RF modules 112, 126, and 128 may transmit and receive RF frequency signals and they may be configured as a single unit or multiple units. The RF modules 112, 126, and 128 may include or be in communication with one or more PCB antennas 130a-130n (collectively 130) and may be configured to transmit and receive wireless communications signals, such as RF signals 110a-110n (collectively 110), from vehicle 104. In one embodiment, RF signals 110 may be any frequency, such as LF RF signals and UHF RF signals, for example. In one embodiment, the RF modules 112 and 128 may operate with LF RF signals. The LF RF signals may range between approximately 30 kHz and 300 kHz, and more preferably between approximately 18 kHz and 150 kHz, for example. In another embodiment, RF module 126 may operate with UHF RF signals. The UHF RF signals may range between approximately 300 MHz and 3,000 MHz, for example. PCB antennas 130 are described in further detail below.

The antenna patterns 110 may be directional or omnidirectional. In one aspect, the communication paths between the RF modules 112, 124, 126, and 128 and LIN BUS 136 may be a wired connection. Additionally, a wireless communication path may use Bluetooth or any other communication protocol. A hardwired communication path may use conventional vehicular bus architecture, such as CAN, LIN, or J1850. Alternatively, a non-standard vehicular bus architecture may be utilized.

In addition, LIN BUS remote control system 100 may be in communication with RF module 128 via LIN BUS 136. RF module 128 may be in communication with one or more microphones 114a-114n (collectively 114) configured to receive sounds locally external to the vehicle. In one embodiment, at least one other microphone (not shown) may be positioned with the vehicle to provide added convenience to users to control electromechanical systems of vehicle 102. Microphones 114 may be configured to operate over a frequency range that includes speech or voice frequencies, as understood in the art. Microphones 114 may be in communication with other RF modules 112, 124, and 126 and control module 106 via LIN BUS 136. Alternatively, a different bus and/or communications protocol may be utilized for microphones 114. Each of microphones 114 may be the same or different and operate to have the same or different coverage patterns 118-118n (collectively 118), respectively.

PCB antennas 130 may be coupled to the vehicle body in any manner and be positioned to have antenna patterns 110 that partially or completely surround the vehicle 104. LIN BUS remote control system 100 may configure a gain to cause antenna patterns 110 to be constant or variable based on manufacturer and/or user settings. Similarly, LIN BUS remote control system 100 may configure a gain for coverage patterns 118 to be constant or vary. It should be understood that the number of PCB antennas 130 and microphones 114 may be the same or different and vary depending on the size, model, type, or any other difference between vehicles produced by one or more vehicle manufacturers. It should further be understood that vehicle 104 may be any consumer, commercial, or military motor, rail, aircraft, or watercraft vehicle.

As further shown in FIG. 1, a transponder/keyfob 120 may be used to communicate with the RF module 126 via PCB antenna 130c. In one embodiment, transponder/keyfob 120 is a passive transponder/keyfob (e.g., radio frequency identification ("RFID") tag) that responds to receiving one of RF signals 138 that operate as a detection signal from LIN BUS remote control system 100 when in a local range of vehicle 104. The transponder/keyfob 120 may generate and communicate at least one authorization code(s) 122 that identifies transponder/keyfob 120 as being associated with LIN BUS remote control system 100, vehicle 104, and/or RF module 126. Alternatively, transponder/keyfob 120 may be an active device that enables active RF communication with LIN BUS remote control system 100. Generally, an active transponder/keyfob 120 may include a power source for powering an integrated circuit contained within transponder/keyfob 120 and transmitting a signal back to RF module 126. The desired distance of operation of transponder/keyfob 120 to RF module 126 may be relevant in determining whether to use a passive or active transponder/keyfob 120, as known to those skilled in the art. In addition, semi-passive transponder/keyfob 120 may be used to power a microchip, but not the return signal to the RF module 126.

RF modules 124, 126, and 128, PCB antennas 130, and microphones 114 may be designed and configured to cause antenna patterns 110 and coverage patterns 118 to overlap and cover the same or similar areas. By covering the same or similar areas, a user who enters an antenna pattern 110a will know that microphone 114b with the respective coverage pattern 118b will receive his or her voice command. By antenna patterns 110 and coverage patterns 118 having the same or similar areas, a determination that a user is located external to vehicle 104 can be made when transponder/keyfob 120 is within an antenna pattern 110 and, more definitively, when a voice command is received from the user.

Additionally, the RF modules 112 and 124 may include capacitive sensors 140a-140n (collectively 140) that may include a probe (not shown), which uses changes in capacitance to sense in distance to a target. Capacitive sensors 140 may further include driver electronics to convert these changes in capacitance into voltage changes and a device to indicate and/or record the resulting voltage change. The capacitive sensors 140 detect and/or sense within a field range 108a-108n (collectively 108) the proximity of a user to a particular capacitive sensor 140, such as to the front or rear doors of vehicle 104.

Figure 2:
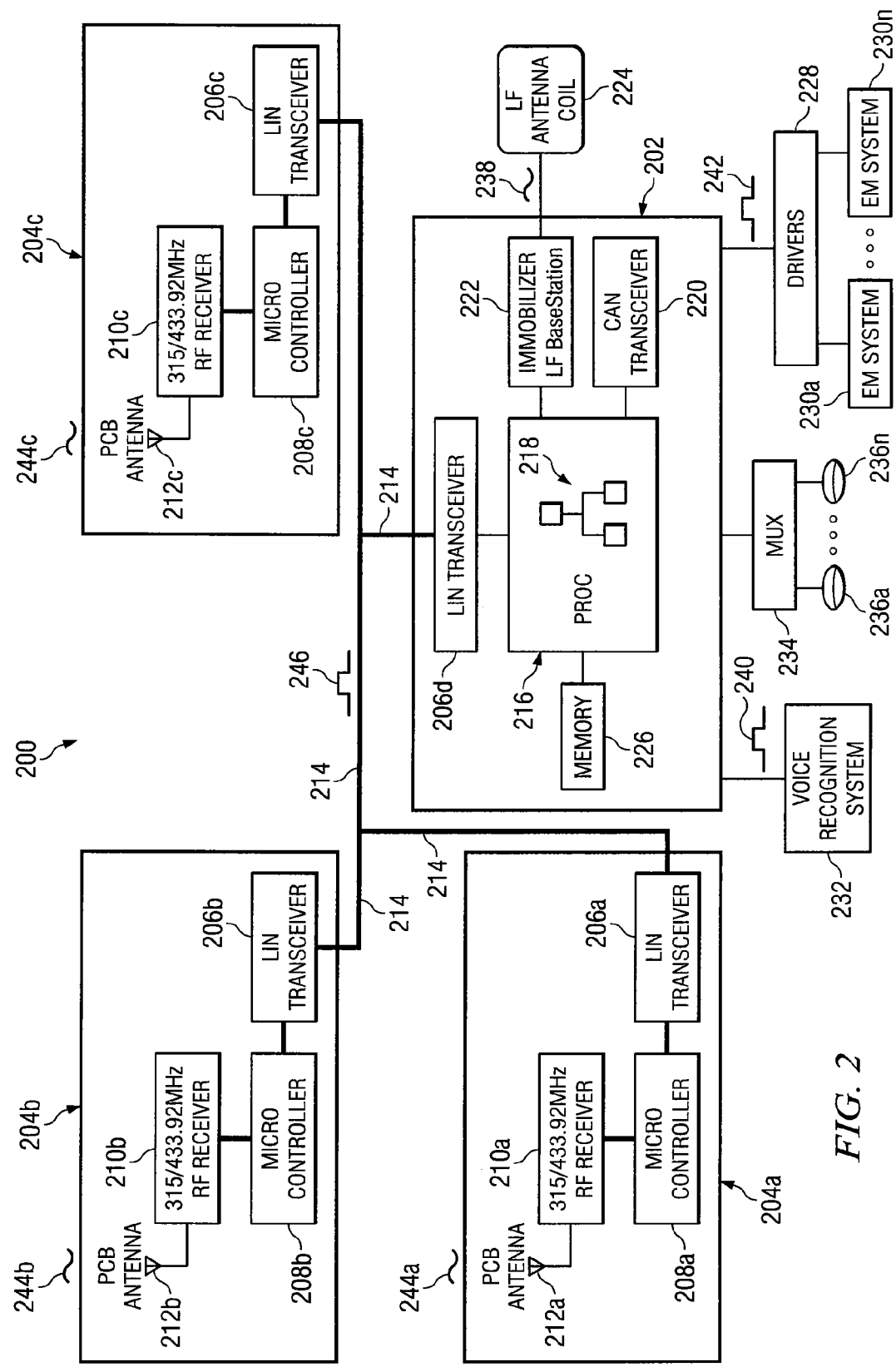
FIG. 2 is a block diagram of an exemplary electrical system that enables a user to control electromechanical systems when the user is located external from a vehicle according to an embodiment of the present invention.
Figure 3A:
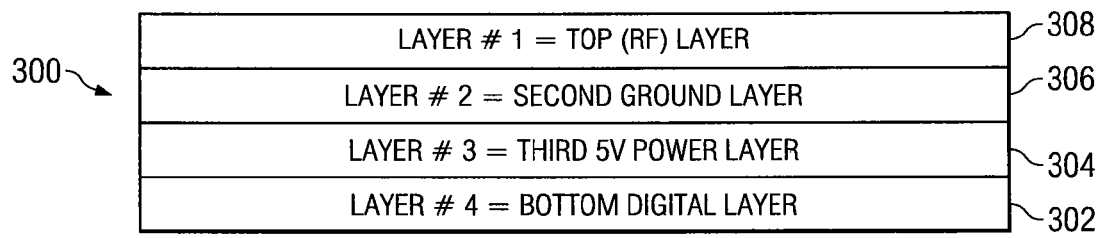
FIG. 3A is a side view of an exemplary PCB antenna according to an embodiment of the present invention.
Figure 3B:
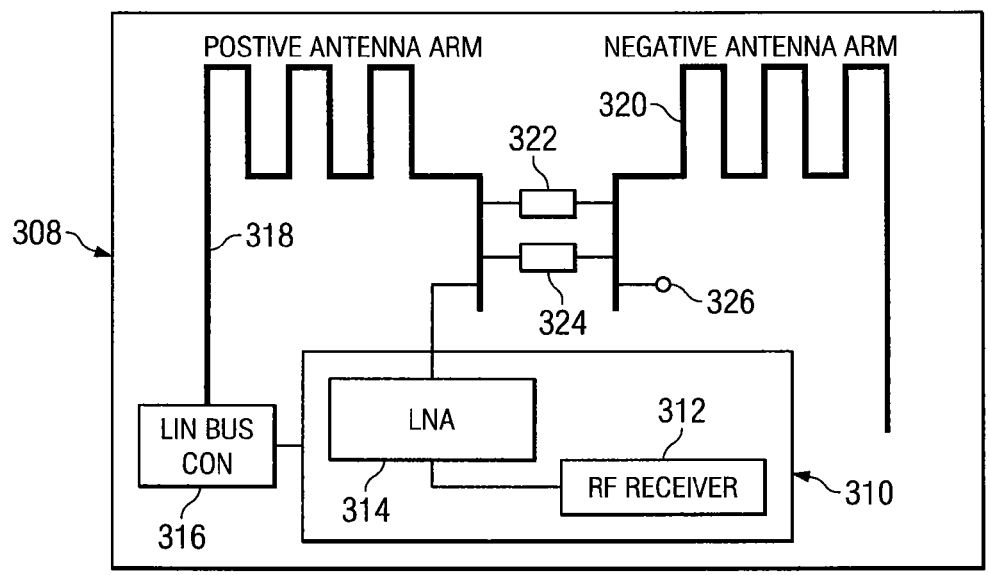
FIG. 3B is a top view of an exemplary top layer of PCB antenna of FIG. 3A according to an embodiment of the present invention.
Figure 3C:
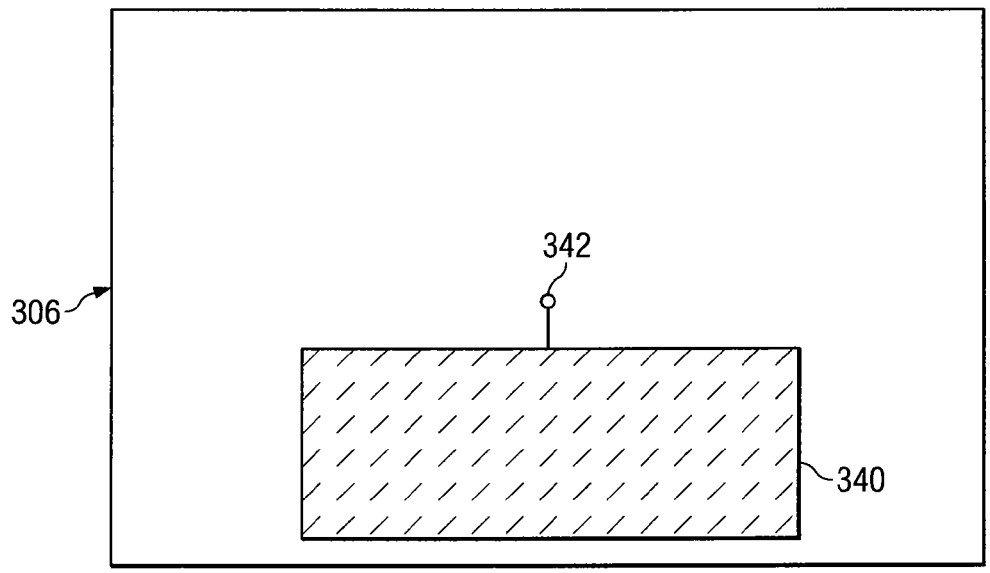
FIG. 3C is a top view of an exemplary ground layer of PCB antenna of FIG. 3A according to an embodiment of the present invention.
Figure 3D:
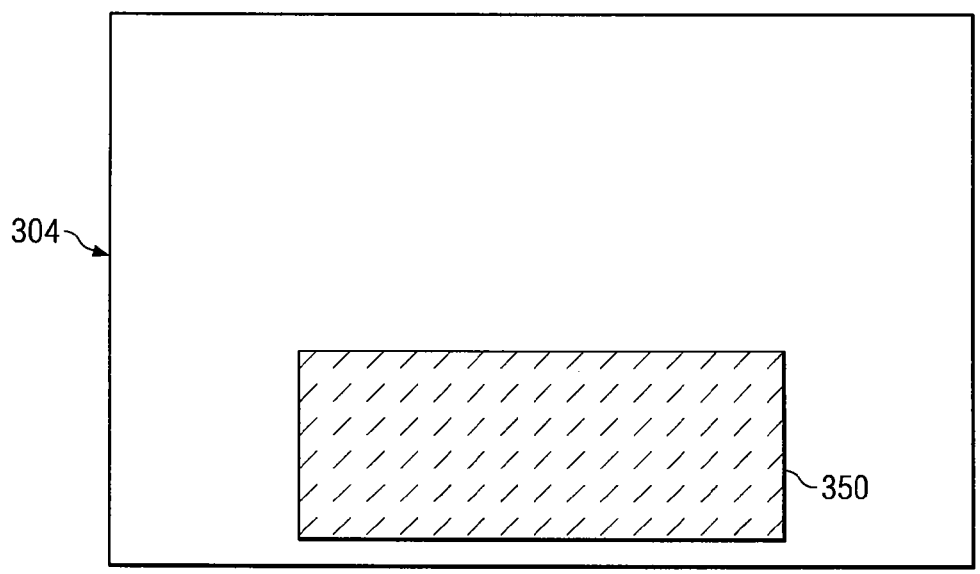
FIG. 3D is a top view of an exemplary power layer of PCB antenna of FIG. 3A according to an embodiment of the present invention.
Figure 3E:
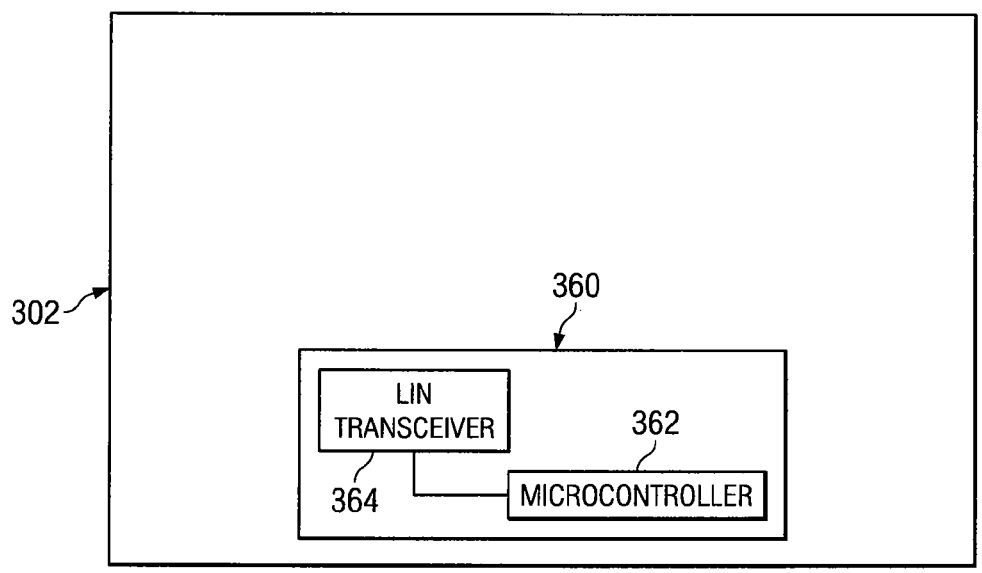
FIG. 3E is a top view of an exemplary digital layer of PCB antenna of FIG. 3A according to embodiment of the present invention.
Figure 4A:
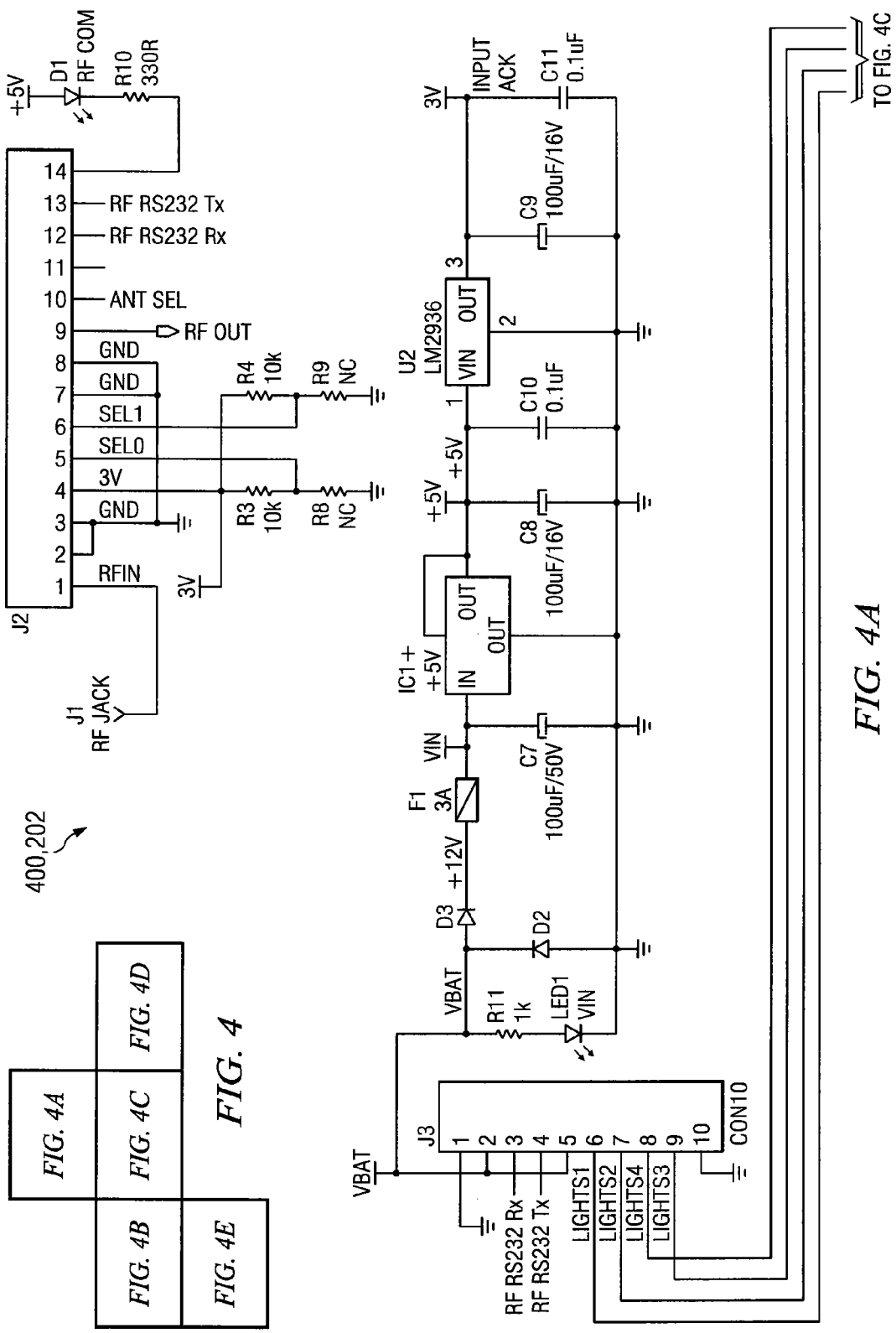
FIG. 4 is a schematic diagram of a LIN control module according to an embodiment of the present invention.
Figure 4B:
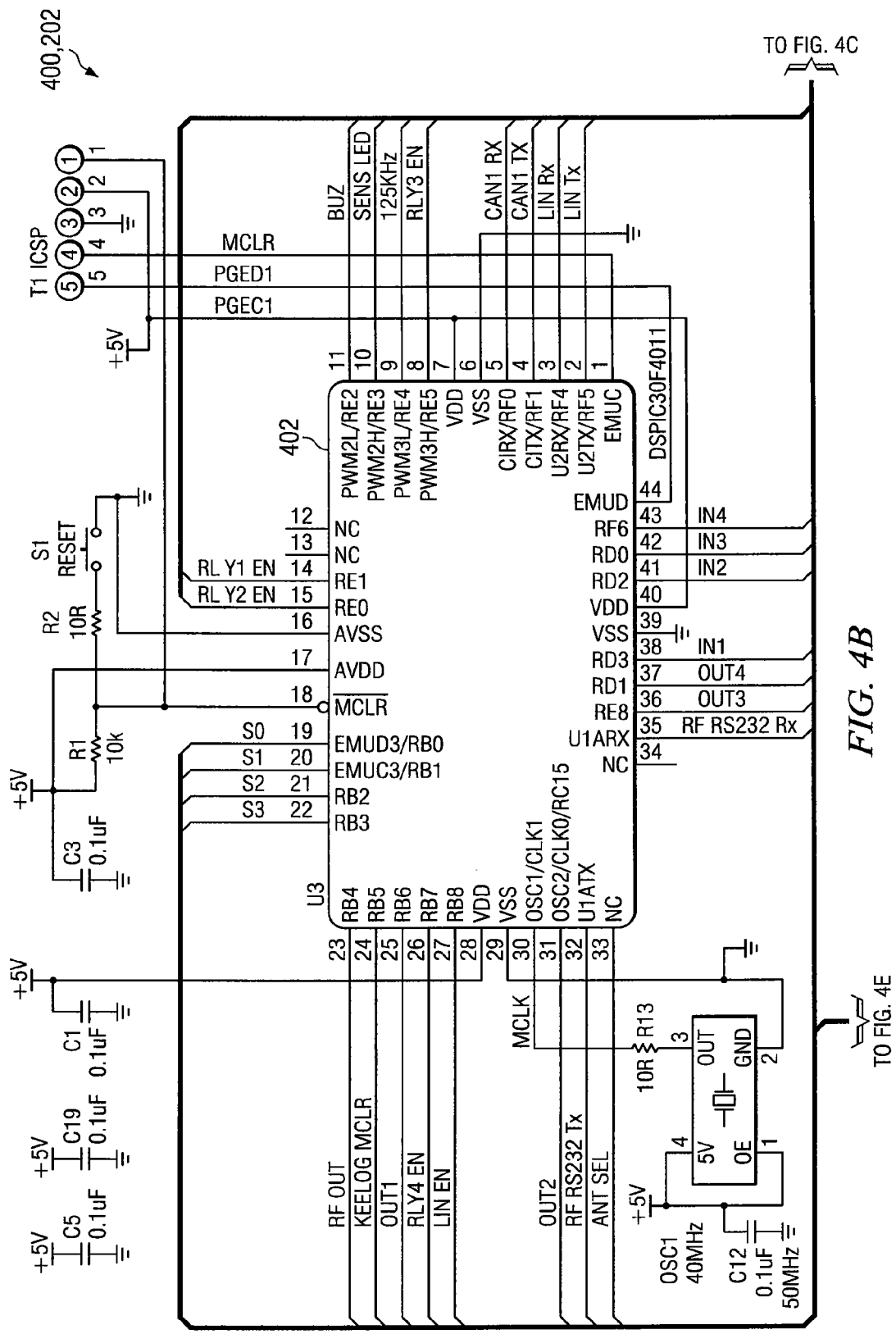
Figure 4C:
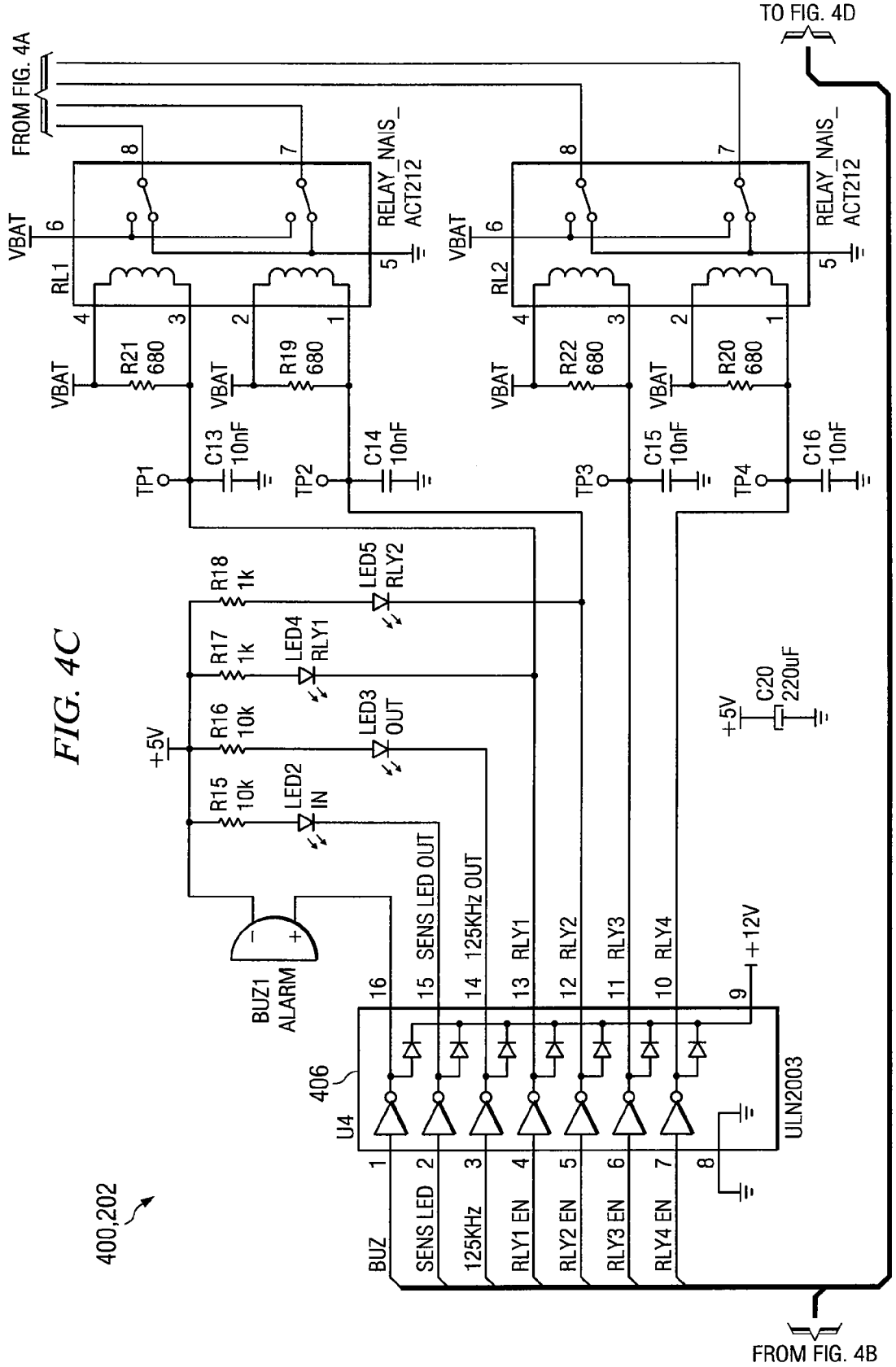
Figure 4D:
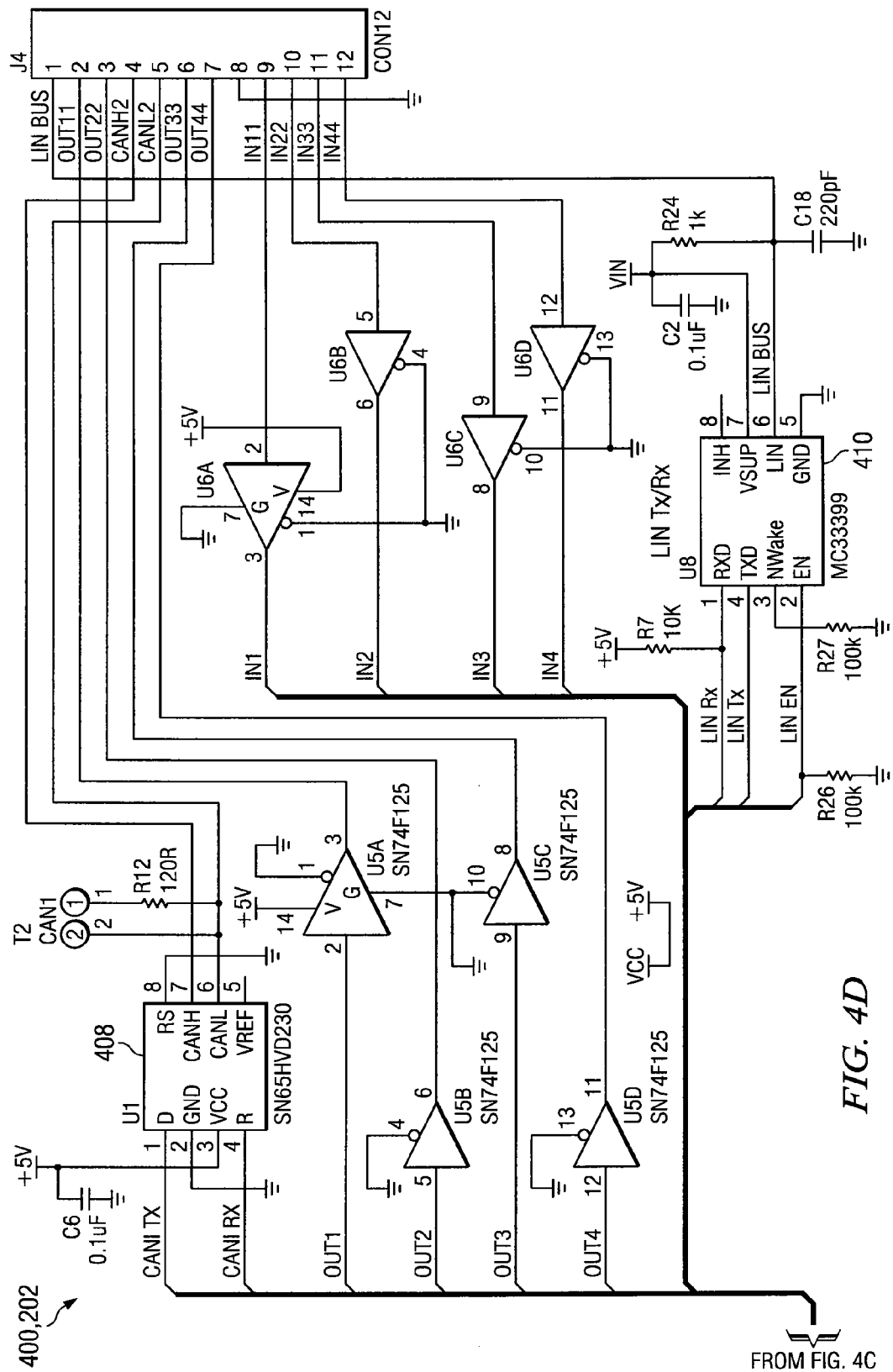
Figure 4E:
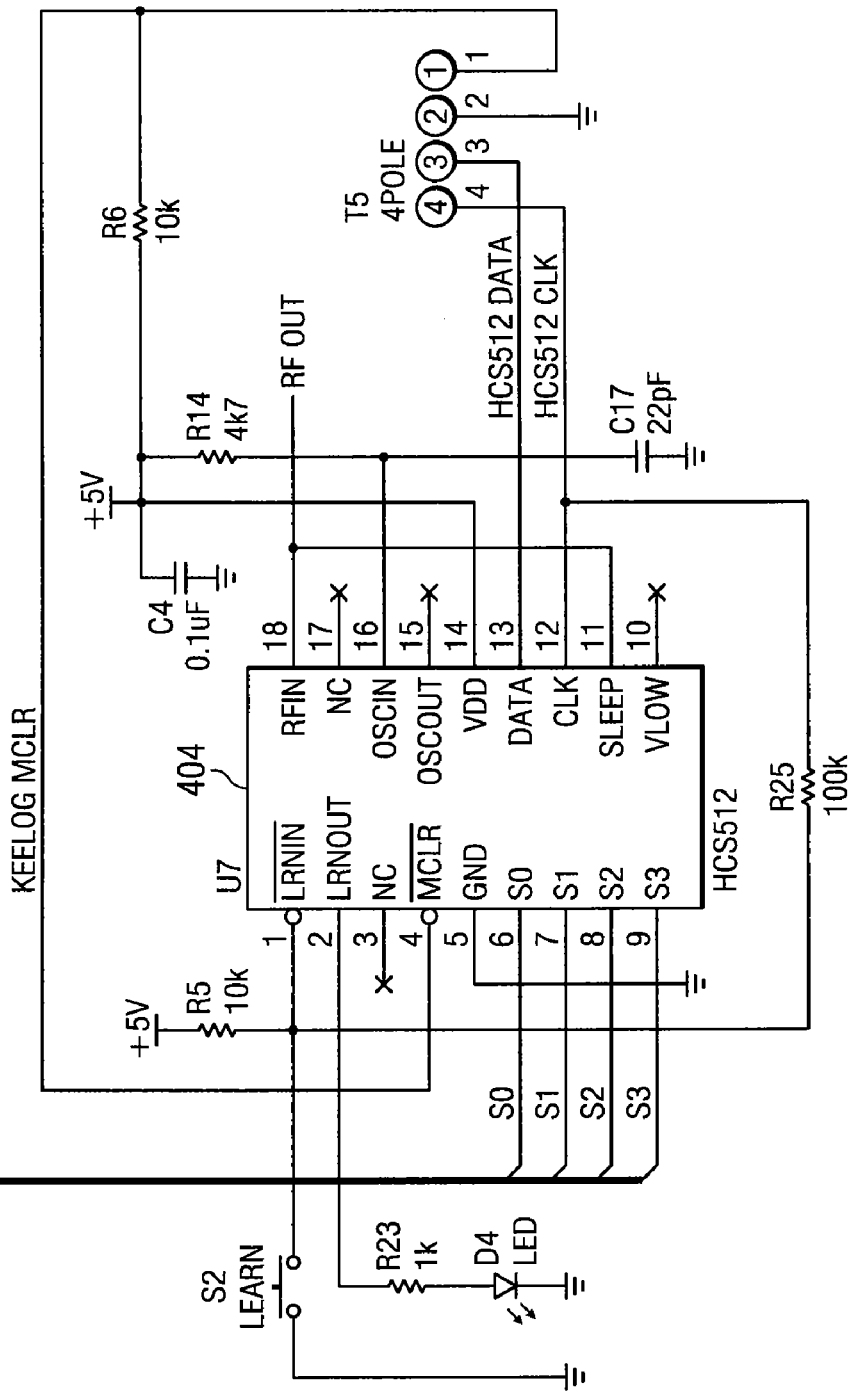

FIG. 2 is a block diagram of an exemplary electrical system 200 that enables a user to control electromechanical systems when the user is located external from vehicle 104. Electrical system 200 may include a LIN control module 202, one or more RF modules 204a-204c (collectively 204), and a voice recognition system 232. In one embodiment, LIN control module 202 and voice recognition system 232 are separate devices. Alternatively, LIN control module 202 and voice recognition system 232 may be combined in a single device. LIN control module 202 may include an LF base station 222 that operates to transmit, receive, and process RF signals 238 via LF antenna 224. Alternatively, LF base station 222 may be a device external from LIN control module 202. LIN control module 202 may further include a processing unit 216 that executes software 218 that operates to communicate with LF base station 222 and voice recognition system 232. In one embodiment, voice recognition system 232 is integrated into software 218. In response to LIN control module 202 receiving a voice command from a user located external to vehicle 104, LIN control module 202 may communicate the voice command to voice recognition system 232, which, in response, may communicate a command notification signal 240, in either a digital or analog format, to LIN control module 202, and, more specifically, processing unit 216 to respond accordingly.

An input/output device, such as a controller area network ("CAN") transceiver 220 may be in communication with the LF base station 222 and/or processing unit 216 and be configured to communicate with PCB antennas 130, voice recognition system 232, and other devices, including a multiplexer 234 and drivers 228. In an alternative embodiment, LIN control module 202 may include multiplexer 234 and/or drivers 228. Multiplexer 234 may be configured to communicate with microphones 236a-236n (collectively 236) and microphones 114. As described with respect to FIG. 1, microphones 236 and 114 may be configured such that sounds are collected external to vehicle 104 by the microphones 236 and 114. To minimize wiring, power, and controller inputs, multiplexer 234 may operate to individually and selectively collect sounds from each of antennas 236 and 114. Drivers 228 may include power circuitry that is configured to receive control signals 242, either digital or analog, and drive electromechanical systems 230a-230n (collectively 230). Although described as being electromechanical, for the purposes of this description, electromechanical systems 230 may alternatively be exclusively electrical, wireless, optical, electro-optical, optoelectromechanical (e.g., fiber optic to electromechanical). In other words, electromechanical systems 230 may be any system of a vehicle that LIN control module 202 is configured to control in response to a user providing a voice command.

In operation, LIN control module 202 may be configured to control operation of the RF and electromechanical systems of the vehicle. Processing unit 216 being in communication with LF base station 222 and voice recognition system 232 may be configured to process or manage processing of signals being received locally external to the vehicle and drive appropriate electromechanical systems in response, as described herein.

RF modules 204a, 204b, 204c (collectively RF modules 204) each include a PCB antenna 212a, 212b, 212c (collectively 212), respectively, in communication with a RF receiver 210a, 210b, 210c (collectively 210), respectively, for receiving transmitted RF signals 244a, 244b, 244c (collectively 244), respectively. RF receivers 210 are each in communication with a microcontroller 208a, 208b, 208c (collectively 208), respectively, which each may be in communication with a LIN transceiver 206a, 206b, 206c (collectively LIN transceivers 206), respectively. LIN transceivers 206 are each in communication with LIN control module 202 via LIN BUS 214.

In one embodiment, LIN control module 202 is a master and LIN transceivers 206 may be slaves for the broadcast serial network, LIN BUS 214. Generally, LIN control module 202 initiates and transmits signals or messages 246 to LIN transceivers 206 with at most one LIN transceivers 206 responding at a time to a given message. In one aspect, microcontrollers 208 may be application-specific integrated circuits ("ASICs"), as are commonly known in the art. In one aspect, microcontrollers 208 may generate all needed LIN data or messages 246, such as protocol and the like, prior to the messages to LIN transceivers 206. In one embodiment, LIN transceivers 206 may be pure LIN nodes.

RF signals 244 may be any desired frequency, and in one embodiment they may be between 300 MHz and 450 MHZ. More preferably, the RF signals 244 are transmitted at one of a frequency of 315 MHz and 433.92 MHz.

Referring now to FIGS. 3A-3E, an exemplary PCB antenna 300 of LIN BUS remote control system 100 is now described. PCB antenna 300 includes a bottom layer 302, a power layer 304, a ground layer 306, and a top RF layer 308. Bottom layer 302 is in communication with a LIN transceiver 364 and a microcontroller 362, which may be the same as any of LIN transceivers 206 and microcontrollers 208. Power layer 304 may be comprised of a metallic or alloy plate, such as a copper plate 350, and the like. Ground layer 306 may be comprised of metallic or alloy plate, such as a copper plate 340, and the like. Additionally, ground layer 306 includes a via 342 for connecting with a via 326 in top RF layer 308. Further, top RF layer 308 may include a module 310 that includes wiring or connections to a RF receiver 312 and a low noise amplifier ("LNA") 314. In passive aspects, top RF layer 308 may not include a LNA 314. Preferably, LNA 314 is in communication with a positive antenna arm 318 that may be in communication with a LIN BUS controller 316. PCB antenna 300 may further include a negative antenna arm 320. A first tuning element 322 and a second tuning element 324 may be in communication with positive antenna arm 318 and negative antenna arm 320 for tuning these antenna arms. Positive antenna arm 318 and negative antenna arm 320 may be a meander trace line antenna design as is commonly known in the art.

In one aspect, positive antenna arm 318 may be a resistor or an inductor. Additionally, negative antenna arm 320 may be a resistor or an inductor. Preferably, one is a resistor and one is an inductor and they are arranged in a parallel. Some exemplary resistor values are 50 ohms and LIN BUS remote control system 100 ohms. By such arrangement, the frequency bandwidth may be increased from approximately 5 MHz to 25 MHz. In such a case, the PCB antennas impedance becomes not so sensitive to the location on vehicle 104. Further, the gain losses caused by the resistor may only be from 1.0 dB to 1.5 dB. Additional inductor values may be approximately 15 nHz for providing a resistor value of approximately 64 ohms. The thickness of positive antenna arm 318 and negative antenna arm 320 may be any thickness, but in one aspect they are approximately 0.1 cm thick.

FIG. 4 illustrates a schematic of an embodiment of a LIN control module 400, such as LIN control module 202, of LIN BUS remote control system 100. LIN control module 400 may include a digital signal controller ("DSC") 402. In addition, LIN control module 400 may include a code hopping decoder 404 for remote keyless entry functionality. Code hopping decoder 404 may be used with code hopping encoders, such as code hopping encoder 308, for use with an encryption algorithm, for example. LIN control module 400 may also include a high voltage, high current darlington arrays 406 for driving loads and the like as described herein. LIN control module 400 may include a CAN transceiver 408 for use in CAN serial communication physical layer, for example. LIN control module 400 may include a LIN transceiver 410 for supporting the 214 in conjunction with the CAN transceiver 408, for example. LIN transceiver 410 may work with sensors, actuators, and the like on vehicle 104. In one embodiment, these units may be wired and/or connected together as shown in the schematic. Other devices may also be part of LIN control module 400 than those described here to provide the functionality as described herein.

Figure 5B:
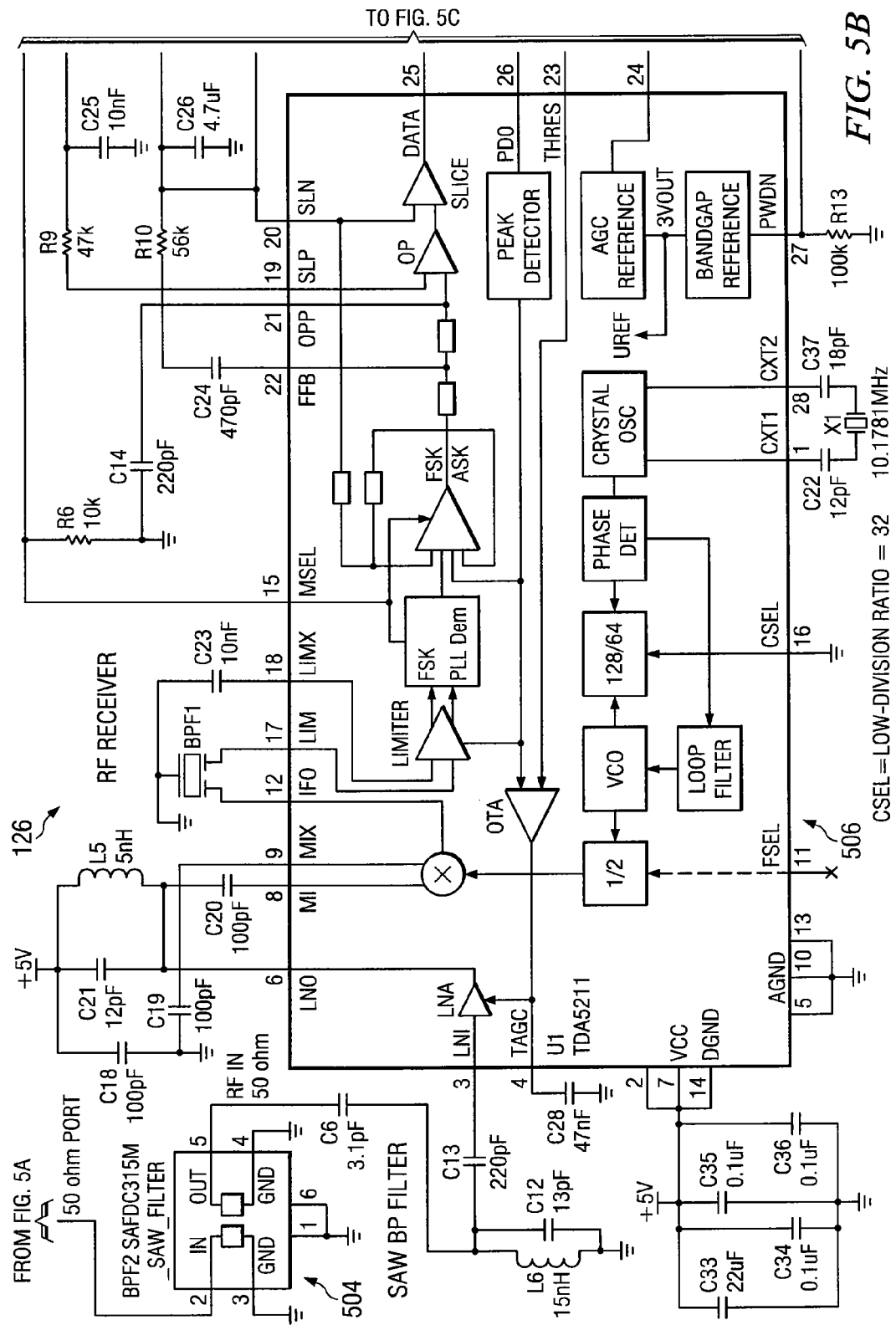
FIG. 5 is a schematic diagram of a RF module according to an embodiment of the present invention.
Figure 5C:
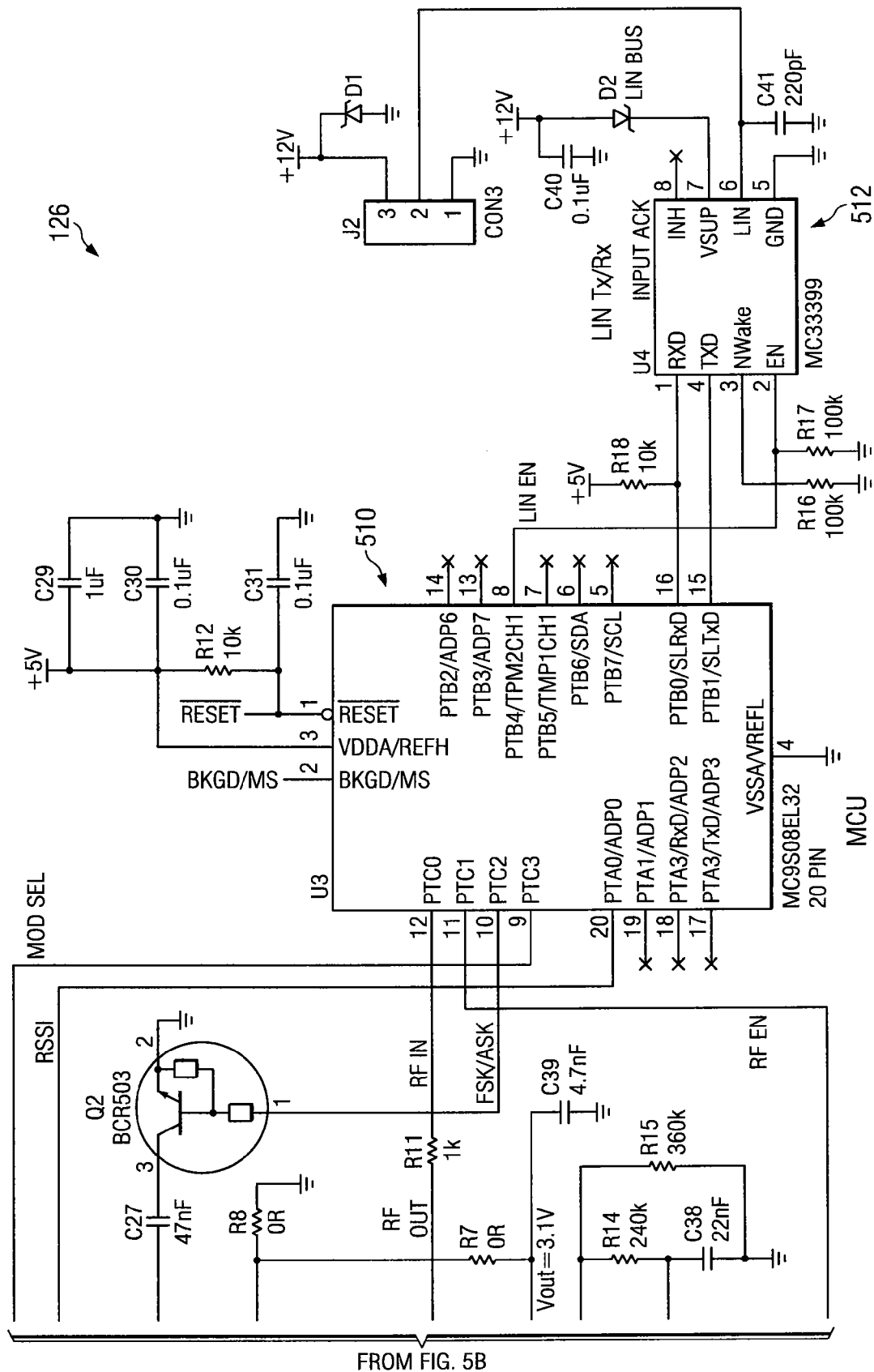

FIG. 5 illustrates a schematic diagram of an embodiment of RF module 126 of the present LIN BUS remote control system 100. The RF module 126 may include antenna(s), such as PCB antennas 130 and 300 for receiving RF signals, such as UHF RF signals at the RF module 126. RF module 126 may further include a n-type, p-type, and n-type ("NPN") bipolar transistor/pre-amplifier. Additionally, the RF module 126 may include a band pass surface acoustic wave ("BP SAW") filter 504 and a RF receiver, such as an ASK/FSK receiver 506 as described herein. The FIRM module 126 may include a low-dropout ("LDO") voltage regulator 508 for providing low voltage operations with capacitors and the like. RF module 126 may further include a microcontroller 510 and a LIN transceiver 512.

RF module 126 may include a remote keyless entry ("RKE") antenna, such as PCB antennas 130 and 300 and for providing functionality to a transponder/keyfob 120 equipped with a RKE transponder. When a button is pressed on the transponder/keyfob 120, the appropriate message (i.e. "unlock doors") is sent from the transponder/keyfob 120 via UHF RF signals, for example, where it is received by PCB antennas 130 and 300 at RF module 126. RF module 126 may receive this information and in turn transmit a message across LIN BUS 136, 214 instructing the other modules to react accordingly.

Figures 6, 6A:
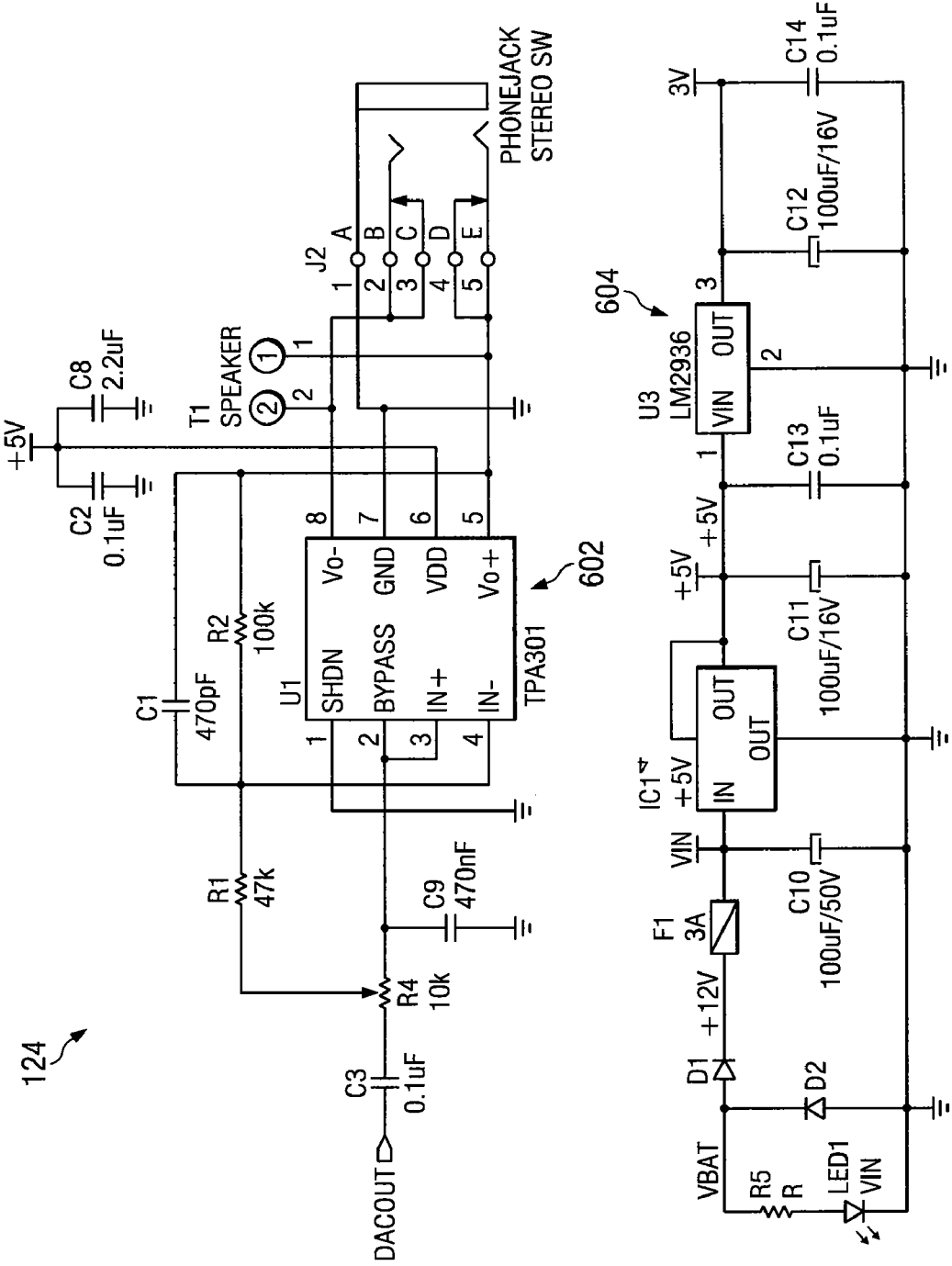
FIG. 6 is a schematic diagram of a RF module with a capacity sensor according to an embodiment of the present invention.
Figure 6B:
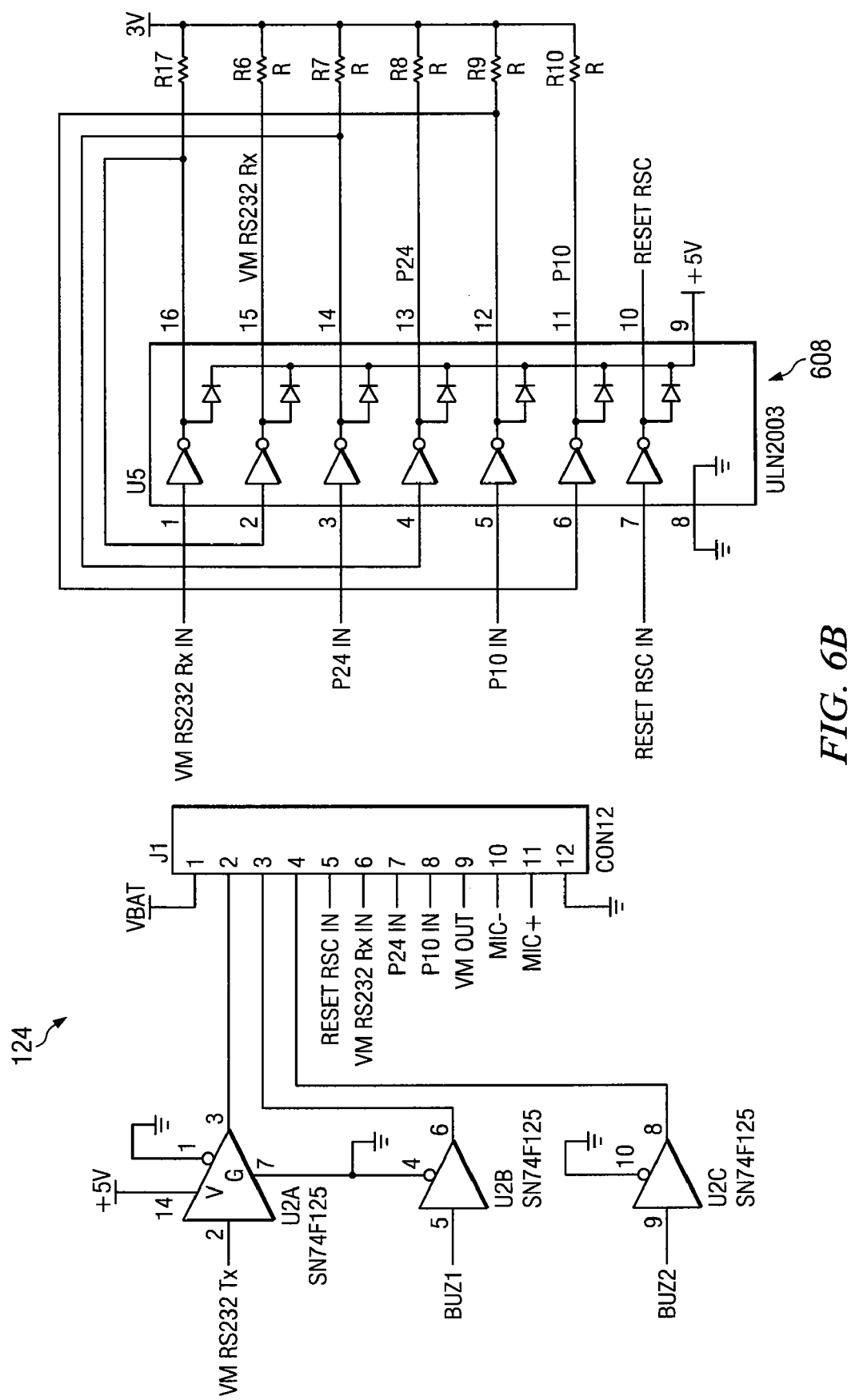
Figure 6C:
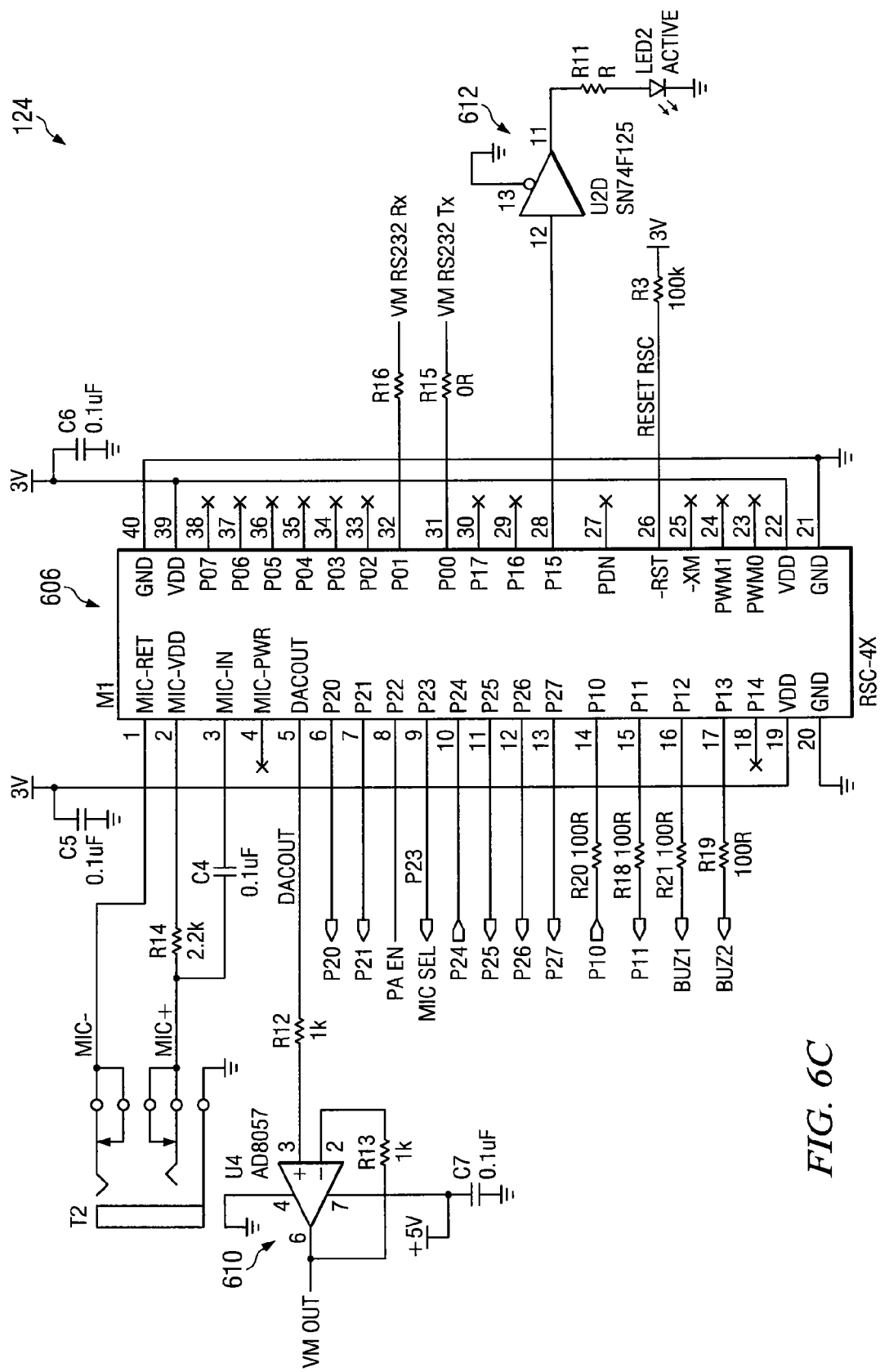

FIG. 6 illustrates a schematic diagram of an embodiment of RF modules 124 and/or RF module 128 of LIN BUS remote control system 100. These RF modules may include an audio power amplifier 602 for delivering power to an output device, such as a jack or speakers, and a LDO voltage regulator 604. These RF modules may further include a speech-recognition and synthesis microcontroller 606 for recognizing the speech of a user for activating systems and modules as described herein. These RF modules may also include a high voltage, high current darlington arrays 608 for driving loads and the like as described herein. These RF modules may further include an amplifier device, such as single and/or dual amplifier 610. Amplifier 610 may be a voltage feedback amplifier with a bandwidth and slew rate as desired for the performance and functionality as described herein. These RF modules may include a bus buffer gate 612, such as a quadruple bus buffer gate with 3-state output. These RF modules may further include capacitive sensors that are used to detect proximity of a user to the vehicle 104.

RF module 128 may include a passive LF RF antenna, such as PCB antennas 130, 300 and a speech/voice activation hardware and software as described herein. RF module 128 may generate and manage a passive LF RF field 110a emitted by PCB antennas 130, 300 anywhere on vehicle 104. Further, RF module 128 may manage the voice activation technology to control the function of power liftgates and/or decklids, for example. In addition, RF modules 112, 124, 126, and 128 and LIN control module 106, 202 may further control sliding doors, power tailgates, power windows, remote vehicle starters, power locks, and car alarms/panic functions of vehicle 104, for example.

In general, RF modules may operate on a 12 volt power supplied by vehicle 100, and in addition to or in place of LIN BUS 136, 214 may communicate via any communications bus methods, including CAN, serial, etc. As described herein, a passive entry transponder may be included inside transponder/keyfob 120, which may further include a key blade, and/or RKE technology. In one aspect, the RF modules 112, 124, 126, and 128 and LIN control module 106, 202 may also operate with a different power supply, such as a 5 volt power supply provided by another RF module, for example.

RF modules 112, 124, 126, and 128 and LIN control module 106, 202 may vary as desired to meet the requirements of vehicle 104. Similarly, the functionality as herein described may vary from module to module. For example the RF modules 112, 124, 126, and 128 and LIN control module 106, 202 may include passive entry antennas, RKE antennas, remote start antennas, capacitive sensing, voice activation, ultrasonic sensing, for example.

The previous detailed description of a small number of embodiments for implementing the invention is not intended to be limiting in scope. One of skill in this art will immediately envisage the methods and variations used to implement this invention in other areas than those described in detail. The following claims set forth a number of the embodiments of the invention disclosed with greater particularity.

What is claimed:

1. A local interconnect network BUS remote control system, comprising:
   a printed circuit board antenna for receiving wireless communications signals and transmitting them to at least one radio frequency module, the printed circuit board antenna having a first coverage pattern, the printed circuit board antenna comprising:
      a digital layer;
      a power layer;
      a ground layer;
      a radio frequency layer including a positive meander line antenna and a negative meander line antenna;
   at least one radio frequency module mounted on the vehicle, the at least one frequency module in communication with the printed circuit board antenna for demodulating the wireless communication signals into local interconnect network signals;
   a local interconnect network BUS in communication with the at least one frequency module for receiving the local interconnect network signals; and
   a local interconnect network controller in communication with the local interconnect network BUS for receiving the local interconnect network signals, the local interconnect network controller including a voice recognition system, the local interconnect network controller configured to determine when a transponder/keyfob associated with a user is in the first coverage pattern based on communication with the printed circuit board antenna;
   a microphone configured to receive sound in a second coverage pattern that substantially overlaps the first coverage pattern wherein the local interconnect network controller is further configured to receive communications over the local interconnect network BUS from the microphone and activate a vehicle system responsive to receiving a communication from the microphone and a determination that the FOB is in the first coverage pattern.

2. The local interconnect network BUS remote control system of claim 1, wherein the radio frequency layer comprises:
   a connection to a radio frequency receiver.

3. The local interconnect network BUS remote control system of claim 1, wherein the radio frequency layer comprises:
   a connection to a low noise amplifier.

4. The local interconnect network BUS remote control system of claim 1, wherein the radio frequency layer comprises:
   a via for connecting with a via in the ground layer.

5. The local interconnect network BUS remote control system of claim 1, wherein the radio frequency layer comprises:
   a first tuning element for tuning the positive meander line antenna and the negative meander line antenna.

6. The local interconnect network BUS remote control system of claim 1, wherein the radio frequency layer comprises:
   a second tuning element for tuning the positive meander line antenna and the negative meander line antenna.

7. The local interconnect network BUS remote control system of claim 1, further comprising:
   the transponder/keyfob configured to generate the wireless communications signal in response to activation by a user.

8. The local interconnect network BUS remote control system of claim 1, wherein the at least one radio frequency module operates with low frequency radio frequency signals between approximately 30 kHz and 300 kHz.

9. The local interconnect network BUS remote control system of claim 1, wherein the at least one radio frequency module operates with ultrahigh radio frequency signals between approximately 300 MHz and 3,000 MHz.

10. The local interconnect network BUS remote control system of claim 1, wherein the local interconnect network BUS comprises a communications line and at least two power lines.

11. The local interconnect network BUS remote control system of claim 1, wherein the vehicle system comprises one of electromechanical devices, control sliding doors, power tailgates, power windows, remote vehicle starters, power locks, car alarms, and panic functions.

12. A local interconnect network BUS remote control system, comprising:
   a printed circuit board antenna for receiving wireless communications signals and transmitting them to at least one radio frequency module, the printed circuit board antenna having a first coverage pattern, the printed circuit board antenna comprising:
      a digital layer;
      a power layer;
      a ground layer;
      a radio frequency layer including a positive meander line antenna and a negative meander line antenna;
   at least one radio frequency module mounted on the vehicle, the at least one frequency module in communication with the printed circuit board antenna for demodulating the wireless communication signals into local interconnect network signals;
   a local interconnect network BUS in communication with the at least one frequency module for receiving the local interconnect network signals;
   a local interconnect network controller in communication with the local interconnect network BUS for receiving the local interconnect network signals, the local interconnect network controller including a voice recognition system, the local interconnect network controller configured to determine when a transponder/keyfob associated with a user is in the first coverage pattern based on communication with the printed circuit board antenna;
   at least one driver in communication of the local interconnect network controller for controlling at least one of electromechanical devices, control sliding doors, power tailgates, power windows, remote vehicle starters, power locks, car alarms, and panic functions
   a microphone configured to receive sound in a second coverage pattern that substantially overlaps the first coverage pattern, wherein the local interconnect network controller is further configured to receive communications over the local interconnect network BUS from the microphone and activate the at least one driver responsive to receiving a communication from the microphone and a determination that the FOB is in the first coverage pattern.

13. The local interconnect network BUS remote control system of claim 12, wherein the radio frequency layer comprises:
a connection to a radio frequency receiver.

14. The local interconnect network BUS remote control system of claim 12, wherein the radio frequency layer comprises:
a connection to a low noise amplifier.

15. The local interconnect network BUS remote control system of claim 12, wherein the radio frequency layer comprises:
a via for connecting with a via in the ground layer.

16. The local interconnect network BUS remote control system of claim 12, wherein the radio frequency layer comprises:
a first tuning element for tuning the positive meander line antenna and the negative meander line antenna.

17. The local interconnect network BUS remote control system of claim 12, wherein the radio frequency layer comprises:
a second tuning element for tuning the positive meander line antenna and the negative meander line antenna.

18. The local interconnect network BUS remote control system of claim 12, further comprising:
the transponder/keyfob configured to generate the wireless communications signal in response to activation by a user.

19. The local interconnect network BUS remote control system of claim 12, wherein the at least one radio frequency module operates with ultrahigh radio frequency signals between approximately 300 MHz and 3,000 MHz.

* * * * *